United States Patent
Dsouza et al.

(10) Patent No.: US 10,621,777 B2
(45) Date of Patent: Apr. 14, 2020

(54) SYNTHESIS OF COMPOSITE IMAGES HAVING VIRTUAL BACKGROUNDS

(71) Applicant: ADOBE INC., San Jose, CA (US)

(72) Inventors: Renzil Leith Dsouza, Bangalore (IN); Dipendra Regmi, Bangalore (IN); Ramesh Srinivasaraghavan, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/980,266

(22) Filed: May 15, 2018

(65) Prior Publication Data

US 2019/0355172 A1 Nov. 21, 2019

(51) Int. Cl.
| | |
|---|---|
| *G06T 15/50* | (2011.01) |
| *G06T 7/70* | (2017.01) |
| *G06T 3/00* | (2006.01) |
| *G06T 15/20* | (2011.01) |
| *G06T 7/20* | (2017.01) |
| *G06T 17/00* | (2006.01) |
| *G06T 7/194* | (2017.01) |
| *G06F 3/01* | (2006.01) |

(52) U.S. Cl.
CPC ............ *G06T 15/503* (2013.01); *G06F 3/017* (2013.01); *G06T 7/194* (2017.01); *G06T 7/20* (2013.01); *G06T 7/70* (2017.01); *G06T 15/205* (2013.01); *G06T 17/00* (2013.01); *G06T 2207/10016* (2013.01); *G06T 2207/20221* (2013.01); *G06T 2215/16* (2013.01)

(58) Field of Classification Search
None
See application file for complete search history.

(56) References Cited

U.S. PATENT DOCUMENTS

2019/0082118 A1* 3/2019 Wang ............... H04N 5/232933

OTHER PUBLICATIONS

U.S. Appl. No. 62/556,297, filed Sep. 8, 2017 (Year: 2017).*
Shen, X., Hertzmann, A., Jia, J., Paris, S., Price, B., Shechtman, E., & Sachs, I. (May 2016). Automatic portrait segmentation for image stylization. In Computer Graphics Forum (vol. 35, No. 2, pp. 93-102).

* cited by examiner

*Primary Examiner* — Nurun N Flora
(74) *Attorney, Agent, or Firm* — Shook, Hardy & Bacon L.L.P.

(57) ABSTRACT

Technologies for synthesis of composite images having a virtual background associated with the orientation, position, or movement of a mobile device are disclosed. In various embodiments, a foreground image is segmented from an image. Further, one or more virtual background images are identified based on the characteristics of the image, such as the orientation of the device that captured the image. Subsequently, the foreground image and the background image are synthesized into a composite image.

20 Claims, 8 Drawing Sheets

SYNTHESIS OF COMPOSITE IMAGES HAVING VIRTUAL BACKGROUNDS

BACKGROUND

Cameras have become a standard feature of smartphones. A natural consequence of the increasing prevalence of smartphones in society is that people take more pictures and videos. For example, a large number of selfies are shared daily on various social networks. A selfie may include a portrait or video of an individual or a group of people. Additionally, sometimes, people desire a different background for their pictures or videos than the actual background in their selfies.

Using conventional technologies to replace a background portion of an image, however, can be difficult and time consuming. For example, one conventional technique to replace a background utilizes green screen composition. As green screens are sizeable, transportation and set-up of such green screens can be tedious. Further, physical placement of a green screen does not allow for movement of the image capturing device. For example, assume a user is capturing a video as the user is moving. In such a case, a background green screen provides little to no assistance in replacing the background portion of the image.

SUMMARY

Embodiments of the present disclosure relate to systems and methods for synthesis of composite images having virtual backgrounds associated with movement of mobile devices. As such, among various aspects of the present disclosure, one aspect is to generate a virtual background image for a foreground object. In particular, in accordance with embodiments described herein, a disclosed system may generate a virtual background image based at least in part on the orientation of a mobile device. Another aspect of the present disclosure is to identify a relationship between virtual background images and foreground images. In particular, for example, a disclosed system may identify one or more virtual background images corresponding to a foreground image, or alternatively, one or more foreground images corresponding to a virtual background image, e.g., based at least in part on one or more characteristics of motion of a mobile device.

To enable synthesis of composite images having virtual backgrounds associated with movement of mobile devices, as described in various embodiments herein, the orientation or motion of the mobile device is determined. For purposes of an example, the facing direction of the camera of the mobile device may be used to determine the orientation of the mobile device. Alternatively, the angular differences between the respective axes of a world coordinate system and the axes of a mobile coordinate system of the mobile device may be used. Additionally, one or more sensors may be used to track various characteristics of the motion of a mobile device, including the distance, the displacement, the angular speed, the linear speed, the acceleration, etc.

In one embodiment, the disclosed system is configured to build a three-dimensional spherical model from a panoramic image and construct a three-dimensional rotation matrix based at least in part on the orientation of the mobile device. The system is further configured to rasterize a part of an equirectangular projection of the panoramic image to form the virtual background image based at least in part on a three-dimensional spherical model and a three-dimensional rotation matrix. The foreground image and the background image can then be synthesized into a composite image.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

Traditionally, green screen compositing techniques are used to replace the background of a picture or a video frame. These techniques have been used in different industries, including newscasting, motion picture, or videogame, etc., to remove the background from a photo or video, and substitute the original background with a desired background. TV newscasting or weather forecasting commonly apply green screen compositing such that a presenter is seemingly standing in front of a computer-generated imagery (CGI) background (e.g., a weather map) with dynamic contents, even though, in actuality, the presenter is standing before a solid green or blue background.

Green screen compositing is a colloquial name for chroma key compositing or chroma keying, which is a technique for compositing two images or video streams together based on color hues (chroma range). Basically, a color range in the foreground is made transparent to allow for a different background to be layered behind the foreground. In the aforementioned applications of green screen compositing, the chroma range of green or blue is made transparent so that the CGI background can be made visible as the layer behind the foreground.

In applying the chroma key compositing technique, however, the actual background of the foreground object has to be a uniform and distinct color. In practice, green and blue backgrounds are commonly used because they differ most distinctly in hue from most human skin colors. If a part of the subject being filmed or photographed has the same color as the background, that part of the subject may become transparent. Because of the color uniformity and distinctiveness needed to operate effectively, the chroma key compositing technique is not easily portable or mobile. For instance, people cannot realistically, or are unlikely to, carry a large screen and set it up as the background everywhere they go. Further, traditional background replacement techniques, including the chroma key compositing technique, generally do not take into account the orientation or motion of the camera. For example, with respect to chroma key compositing techniques, even if an individual sets up a background screen, movement of the camera can take the background outside of the background screen boundaries. As another example, traditional background replacement techniques that do not utilize a background screen can result in unrealistic composite videos, particularly for dynamic videos as the background perspective changes. For instance, for dynamic video shooting, such as for sports or any other moving foreground subject/object, traditional background replacement techniques may yield unrealistic looking composite videos because the replaced virtual backgrounds mismatch with viewers' perception of tracking a moving foreground subject/object in the real world.

In this disclosure, technical solutions are provided to enable synthesis of composite images having virtual backgrounds that correspond with the orientation, position, and/or movement of the image capturing device (e.g., mobile devices). In this regard, as a mobile device moves in position, the existing or original background images, for example in a video, can be replaced with a virtual background associated with an orientation or position of the mobile device. By way of example only, assume a user captures a selfie video in which the orientation or position of the mobile device is moved. In such a case, the original background in the selfie video can be replaced with a virtual background (having mixed colors) that aligns or synchronizes with the camera motion. As described herein, the disclosed techniques can also enable a live synthesis of a realistic virtual background in a mobile selfie video adapted to or synchronized with the camera motion. Advantageously, amateur users can place themselves or any foreground object into a virtual world.

At a high level, and as described in reference to illustrative embodiments, a motion processor is configured to determine the orientation or motion of a mobile device. The foreground object may be segmented from the images captured with various orientations or motions of the mobile device, for example, using automatic portrait segmentation or deep-learning based portrait segmentation. In some embodiments, a binary mask of the foreground object is produced. Based on the orientation or motion of the mobile device, corresponding virtual background images are identified or generated from virtual background image resources, such as stock images, videos, or computer-generated imagery. The foreground object and the virtual background image are then synthesized into a composite image.

This process may be repeated for each frame in a video. In the resulting composite video, the foreground object and the virtual background image can be synchronized based on the orientation or motion of the mobile device such that a video having a realistic virtual background is created. Thus, a viewer will perceive the resulting composite video as if it was taken in the virtual background while the mobile device was moving or turning to track a foreground object. For example, suppose an original input is a selfie video shot by rotating a camera 360 degrees around a foreground object. The resulting composite selfie video will look as if the camera was rotated 360 degrees around the foreground subject or object in a virtual environment. Foreground subjects or objects are interchangeable in this disclosure. Adapting to orientation, position, or movement of a camera is a significant improvement over the traditional techniques, such as the chroma key compositing technique, wherein the background generally does not automatically adapt to the orientation or motion of the camera.

Specifically, in one embodiment, upon accessing an image resource, a virtual background image is generated by identifying a portion of the image resource that is associated with or corresponds to a particular location, position, or orientation of the mobile device. By way of example, the disclosed system builds a three-dimensional spherical model from a panoramic image and constructs a three-dimensional rotation matrix based at least in part on the orientation of the mobile device. The system rasterizes a part of an equirectangular projection of the panoramic image to form the virtual background image based at least in part on the three-dimensional spherical model and the three-dimensional rotation matrix. Thereafter, the system synthesizes the foreground image and the background image into a composite image. This and other aspects of the disclosure will be further discussed in connection with figures herein.

In another embodiment, the disclosed system is configured to select one or more background images to match with each of the foreground images. Alternatively, the system can select one or more foreground images to match with a background image. Such one-to-one, one-to-many, or many-to-one relationships may be identified based at least in part on the characteristics of the motion of the mobile device, including the distance, the displacement, the angular speed, the linear speed, the acceleration, etc. In this way, a sequence of foreground images may be synthesized with a sequence of virtual background images. This and other aspects of the disclosure will be further discussed in connection with figures herein.

Figure 1A:
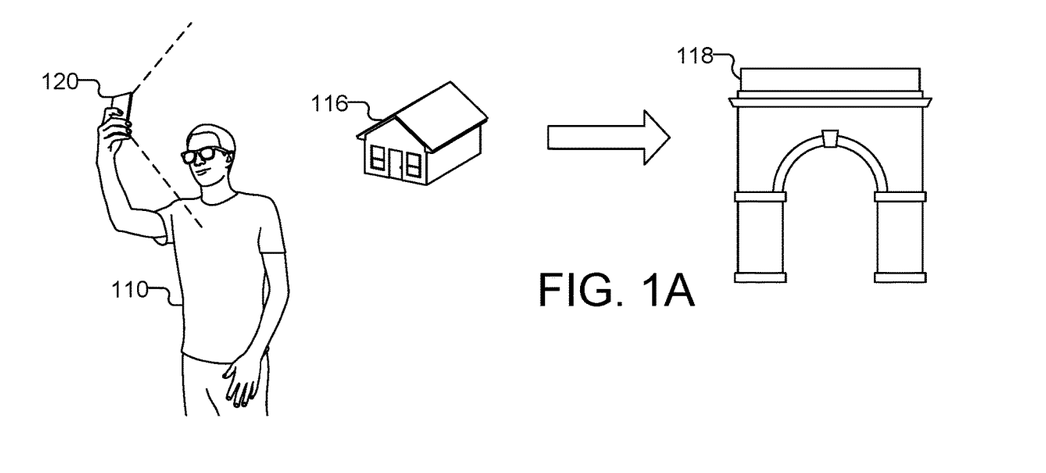
FIGS. 1A-1C are diagrams illustrating an example of synthesis of virtual background, incorporating aspects of the present disclosure, in accordance with one embodiment.
Figure 1B:
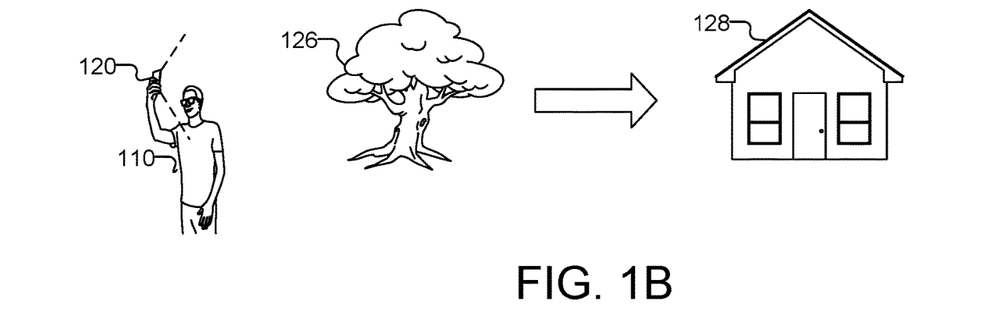
Figure 1C:
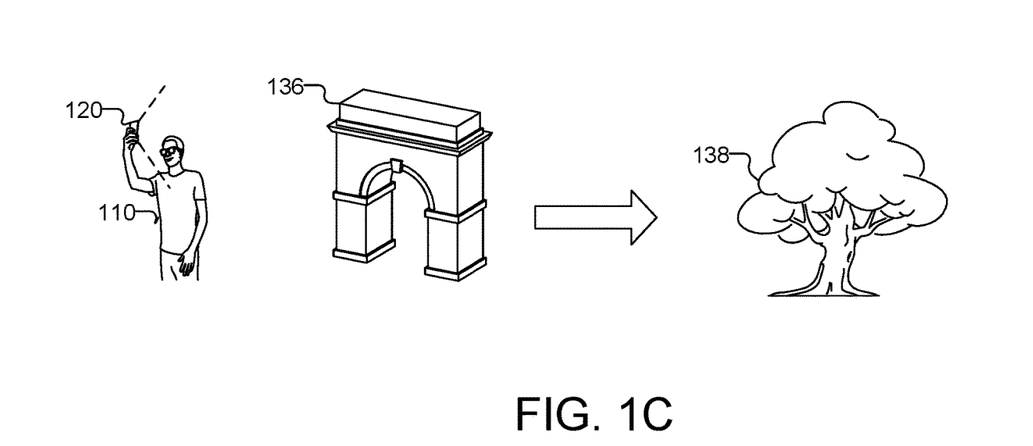

Referring now to FIGS. 1A-1C, the diagrams illustrate an example of synthesis of composite images having virtual backgrounds that correspond with the orientation, position, and/or movement of the image capturing device (e.g., mobile devices). In the first experience, user 110 is holding up mobile device 120 to take a selfie video by rotating mobile device 120 to capture different backgrounds. At a first instance in time, while mobile device 120 is at the first orientation, background 116 is captured. At a second instance in time, while mobile device 120 is at the second orientation, background 126 is captured. And at a third instance in time, while mobile device 120 is at the third orientation, background 136 is captured. The selfie video includes backgrounds 116, 126 and 136 with user 110 being in the foreground.

However, in the second experience, user 110 decides to switch the original background with a virtual background in another selfie video while using the same shooting setting as in the first selfie video. After turning on a system for synthesis of virtual background in mobile device 120, now mobile device 120 presents a composite video in real time with user 110 as the foreground, but with virtual background 118 when mobile device 120 is at the first orientation, virtual background 128 when mobile device 120 is at the second orientation, and virtual background 138 when mobile device 120 is at the third orientation.

Greatly improved from conventional techniques, in this new experience, there is no need for user 110 to set up a green screen or post-edit the selfie video. In the new experience, mobile device 120 with the improved system for generating virtual backgrounds creates a real-time unique effect for user 110, i.e., a real-world object inside a virtual world. User 110 may further use gestures, e.g., swipe, pinch, touch, drag, etc., to select different virtual worlds or to change the background as needed. Advantageously, the resulting composite selfie video looks as realistic as the original video since the virtual background at each instance will adapt to the motion of mobile device 120.

Figure 2:
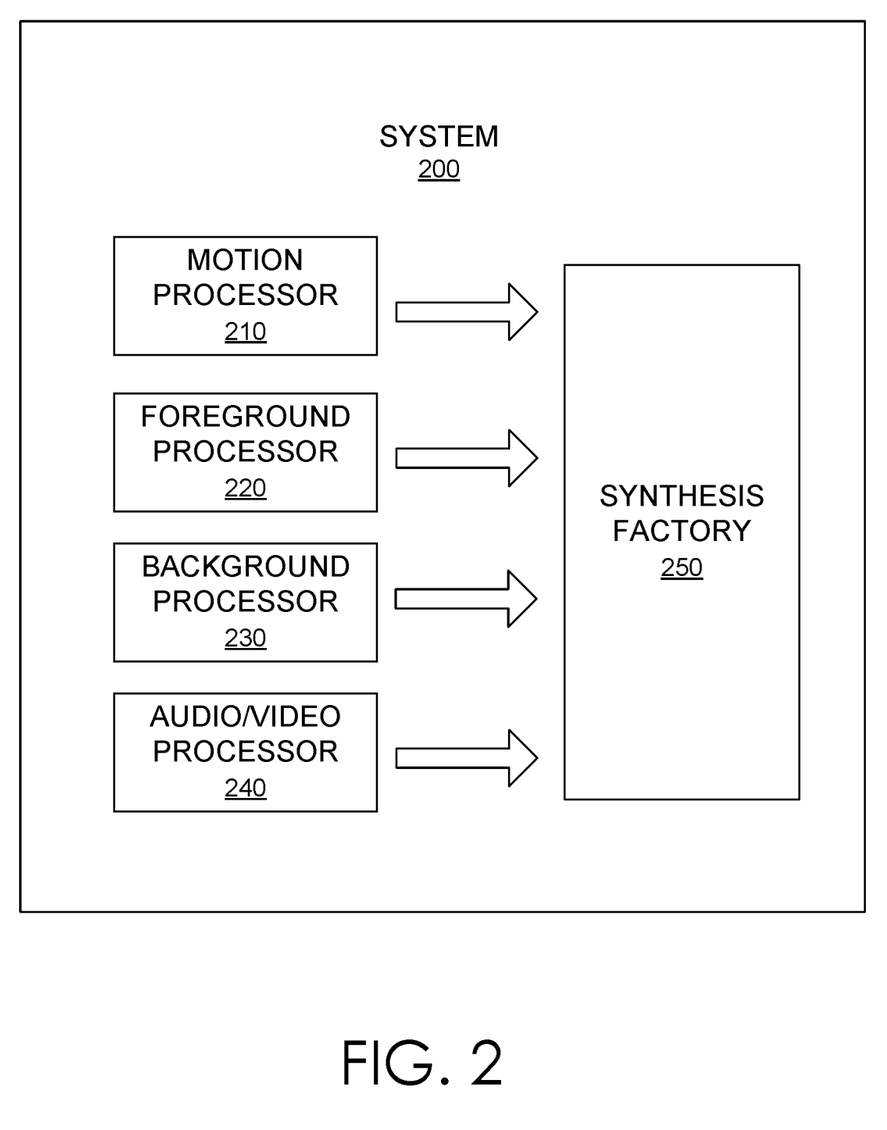
FIG. 2 is a diagram illustrating an example implementation of a system for synthesis of composite images, incorporating aspects of the present disclosure, in accordance with one embodiment.

Referring now to FIG. 2, a system diagram illustrates an example implementation of a system for synthesis of composite images having virtual backgrounds that correspond with the orientation, position, and/or movement of the image capturing device (e.g., mobile devices). In accordance with various embodiments, user 110 in FIG. 1 may interact with system 200 via various user actions. As illustrated in FIG. 2, system 200 includes motion processor 210, foreground processor 220, background processor 230, audio/video processor 240, and synthesis factory 250, operatively coupled with each other.

Motion processor 210 detects and tracks the motion, position, and/or the orientation of a mobile device. As can be appreciated, motion processor 210 can detect or identify motion, position, and/or orientation of a device in any number of ways. By way of example, modern smartphones are equipped with numerous sensors, such as gyroscope, accelerometer, magnetometer, motion sensors, light sensors, CMOS sensors, depth sensors, GPS sensors, etc. Motion processor 210 may utilize these or other sensors to track the orientation of the mobile device, or various characteristics of the motion of the mobile device, such as the distance, the displacement, the angular speed, the linear speed, the acceleration, etc.

Figure 3A:
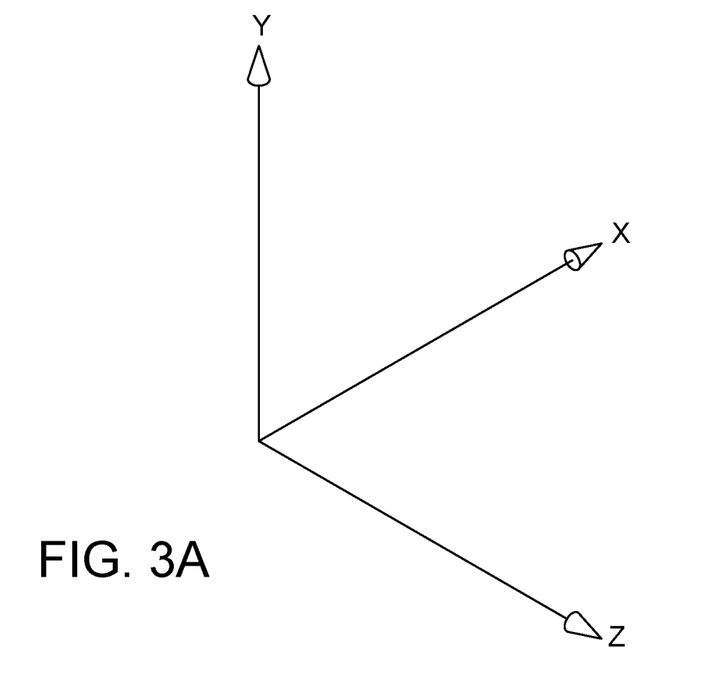
FIGS. 3A-3B are diagrams illustrating examples of three-dimensional coordination systems, incorporating aspects of the present disclosure, in accordance with one embodiment.
Figure 3B:
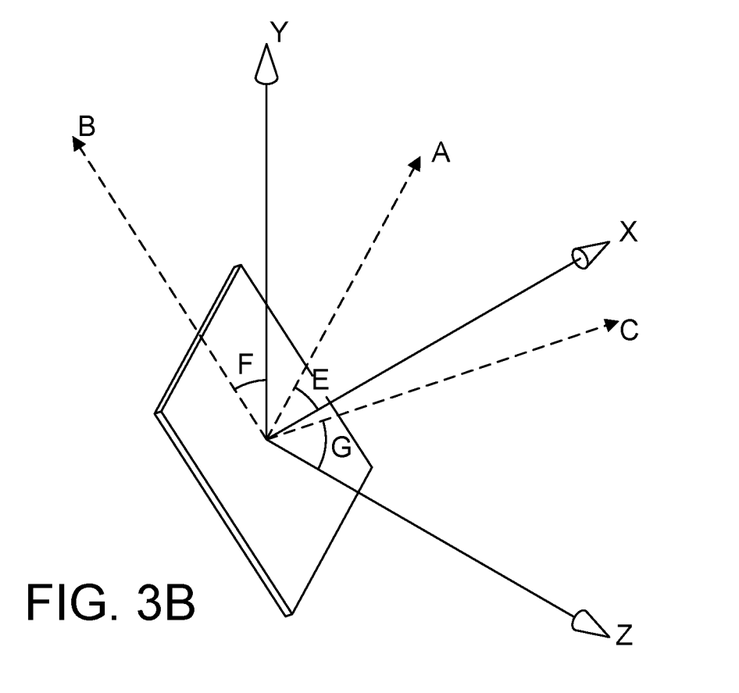

In some embodiments, motion processor 210 may utilize the facing direction of a camera of the mobile device to determine the orientation of the mobile device. In some embodiments, motion processor 210 may use the angular differences among respective axes of a world coordinate system and the axes of a mobile coordinate system of the mobile device to represent the orientation of the mobile device, as illustrated in FIGS. 3A-3B. Other techniques may also be used to detect and represent the motion or the orientation of the mobile device, some of which are described below To detect orientation, motion processor 210 may utilize special orientation sensors. In some embodiments, orientation sensors may include a gyroscope sensor, a magnetometer, or other sensors or combination thereof to determine the orientation of the mobile device. By way of example, based on the central gravitational pull, an orientation sensor may detect whether a mobile device is facing up or down. Based on the strengths of magnetic fields, an orientation sensor may detect whether a mobile device is facing north or south.

An orientation sensor may also have optical or magnetic means to measure rotation of the mobile device. In some embodiments, the initial orientation of the mobile device is registered as the starting point. The orientation sensor may then measure the angle of rotation from the starting point. A change of the orientation may also indicate a motion. Further, the orientation of the mobile device may indicate the focus of its user.

In various embodiments, motion processor 210 can employ motion sensors, among other things, to identify various characteristics of a motion of the mobile device, such as tracking physical locations and movements of the mobile device. A motion sensor may include various sensor components, e.g., a gyroscope, an accelerometer, and a magnetometer, infrared lights, infrared cameras, light sensors, 3-D scanners, CMOS sensors, a GPS sensor, etc. The characteristics of the motion of the mobile device may include the velocity, the acceleration, the direction, the distance, the path, the duration, the frequency, etc. In some embodiments, such characteristics may form a gesture recognizable by the mobile device.

Foreground processor 220 associates the orientation, position, and/or motion of the mobile device with a particular image. In some embodiments, the metadata of this association is explicitly stored with the image. By way of example, after the mobile device captures an image at a particular orientation or during a particular motion, the information of the orientation and the motion may be stored as metadata with or within the image. In other embodiments, the information of the orientation and the motion may be stored in a separate data structure operatively linked to the image. Still in other embodiments, the information of the orientation and the motion may be dynamically matched with the image, e.g., based on their respective timestamps.

Foreground processor 220 further segments the foreground object from the image. To accomplish such segmentation, foreground processor 220 may use different segmentation techniques, including but not limited to, automatic portrait segmentation, deep-learning based portrait segmentation, etc.

Background processor 230 is generally configured to generate a background image as the virtual background for the segmented foreground object produced by foreground processor 220. At a high level, and as described in more detail below, the background image can be generated such that it corresponds with the motion, position, and/or orientation of the mobile device. Accordingly, the background image can appear to align with the foreground image, e.g., based on the movement of the mobile device. In some embodiments, background processor 230 generates a background image according to the process described with reference to FIG. 6. In some embodiments, background processor 230 can match a set of background images with a set of foreground images according to the process described with reference to FIG. 7.

As described in various embodiments, system 200 generates a composite video with a set of foreground images and a set of background images. In various embodiments, to generate the background image, both 3D and 2D image resources may be used. For example, the image resource for the virtual background may be a 360 degree image or video or an equirectangular projection of a panoramic image or video. Such image resources may be stored in various formats, such as in JPG, PNG, MP4, MKV, etc.

In various embodiments, audio/video processor 240 may determine suitable audio models and video models to be used in the resulting composite image or video. As an example, audio models with 3D audio effects may be used, which may involve virtual placement of sound sources in three-dimensional space, e.g., including behind, above or below the listener. As another example, various 3D modeling techniques may be used for 3D video models. Audio/video processor 240 may supply various 3D-models, for example OBJ, 3DS, etc., to synthesis factory 250. For audio models, audio/video processor 240 may supply 3D sound, e.g., based on a head-related transfer function (HRTF) or a full-sphere surround sound technique (ambisonic), to synthesis factory 250.

The synthesis factory 250 is generally configured to generate a composite image that includes a background image based on orientation, position, and/or location of a mobile device (e.g., capturing a video). In this regard, the synthesis factory 250 can obtain (e.g., receive or access from storage) a foreground image, a foreground mask, and a virtual background image and use such components to generate a composite image. In various embodiments, the foreground image is captured by a mobile device. Therefore, the foreground image may vary based on the orientation or the motion of the mobile device. Accordingly, the foreground mask will also vary based on the orientation or the motion of the mobile device. As described, the virtual background image is identified based on the orientation, position and/or the motion of the mobile device. Resultantly, the composite image looks as if the foreground object is realistically situated in the virtual environment. Further, various audio/video models supplied by audio/video processor 240 may be synthesized into the final product to make it even more realistic. For example, the full-sphere surround sound may also match the orientation or the motion of the mobile device.

In some embodiments, system 200 is embodied as a specialized computing device in a mobile phone. In some embodiments, system 200 can be embodied, for example, as an application, a mobile application, or an online computing service. In some embodiments, system 200 can be a distributed system, for example, motion processor 210, foreground processor 220, background processor 230, audio/video processor 240, and synthesis factory 250 can be distributed across any number of computing devices. Regardless of the computing platform on which system 200 is implemented, system 200 can be embodied as a hardware component, a software component, or any combination thereof for synthesizing composite images with mobile devices.

In other embodiments, systems for synthesis of composite images can be implemented differently than depicted in FIG. 2. As one example, some of the components depicted in FIG. 2 may be divided into multiple components. For instance, motion processor 210 can be implemented as separate components to process the orientation and the motion separately. As another example, some of the components depicted in FIG. 2 may be combined into a unified component. For instance, audio/video processor 240 may be incorporated into synthesis factory 250. As yet another example, components depicted in FIG. 2 may have a direct or indirect connection not shown in FIG. 2. In this way, the components depicted in FIG. 2 can be connected in any number of ways and are not limited to the connections illustrated in FIG. 2.

Additionally, system 200 may be implemented as a subsystem in a mobile device. Alternatively, system 200 or one or more components in system 200 may be implemented external to the mobile devices, such as in a remote server, operatively coupled to the mobile device.

FIGS. 3A-3B are diagrams illustrating example three-dimensional coordination systems in accordance with one embodiment. The motion or the orientation of a mobile device is observed in view of a frame of reference to an observer and the change in position of the mobile device relative to that frame. By way of example, motion of the mobile device may be described in terms of displacement, distance, velocity, acceleration, time, speed, etc. in reference to a change in position relative to the frame of reference.

FIG. 3A illustrates a world coordinate system with three axes, X, Y, and Z, while FIG. 3B illustrates a mobile coordinate system with three axes, A, B, and C. In some embodiments, the angular differences ($R_{mobile}$) among respective axes of the world coordinate system and the mobile coordinate system can be used to represent the orientation of the mobile device. $R_{mobile}$ is a vector of the three angles E, F, G in FIG. 3B corresponding to the angular difference between the axes of the world and mobile coordinate systems. In short, $R_{mobile}$ is the vector of [E, F, G]. In various embodiments, $R_{mobile}$ axes may be used to represent the orientation of the mobile device or to calculate the rotation of the mobile device.

Figure 4A:
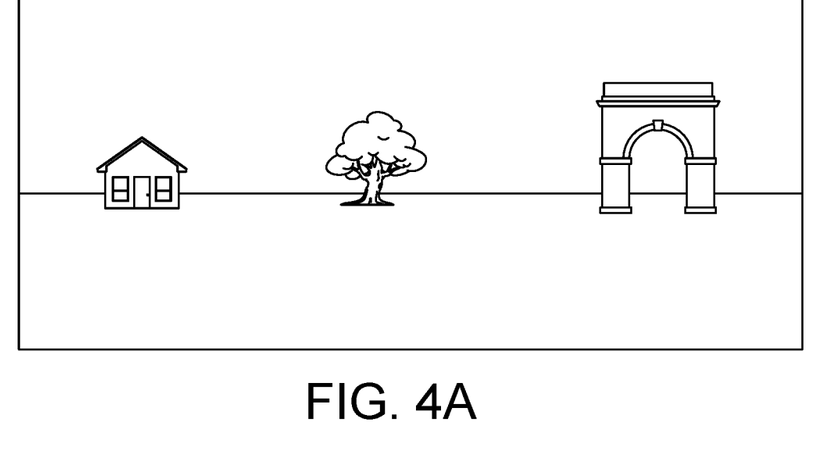
FIGS. 4A-4B are diagrams illustrating an example panoramic image and an example spherical model, incorporating aspects of the present disclosure, in accordance with one embodiment.
Figure 4B:
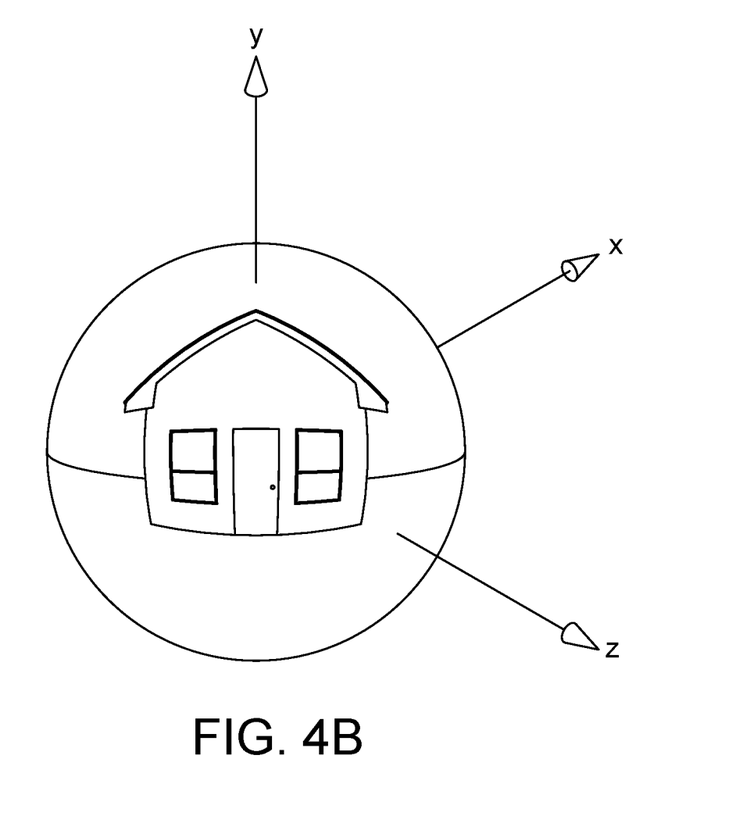

FIGS. 4A-4B are diagrams illustrating an example panoramic image and an example spherical model in accordance with one embodiment. FIG. 4A illustrates an equirectangular projection of a panoramic image, which may be used as the image resource for a virtual environment. FIG. 4B illustrates an example 3-D spherical model, which is formed by projecting the panoramic image from FIG. 4A to a sphere using an equirectangular projection function.

Figure 5A:
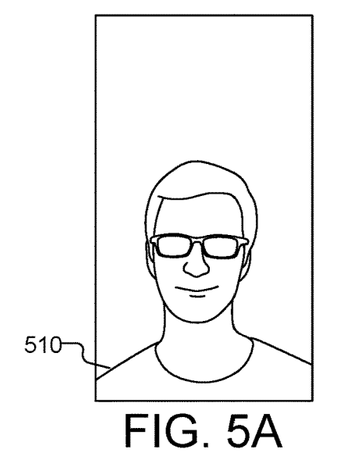
FIGS. 5A-5C and 5E-5G are diagrams illustrating another example of synthesis of composite images, incorporating aspects of the present disclosure, in accordance with one embodiment.
Figure 5B:
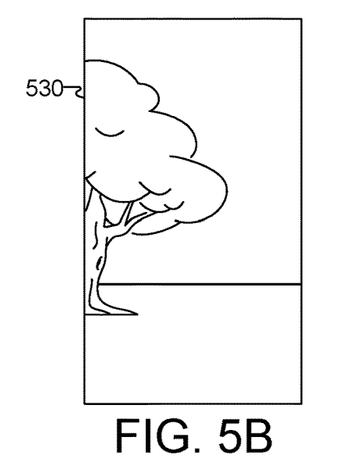
Figure 5C:
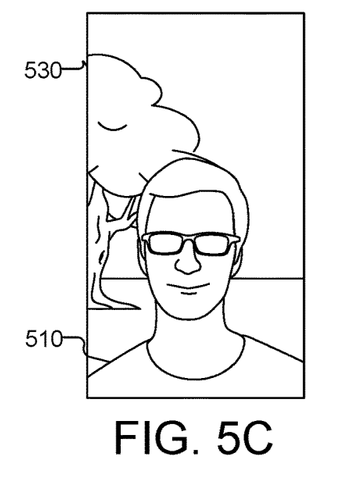
Figure 5E:
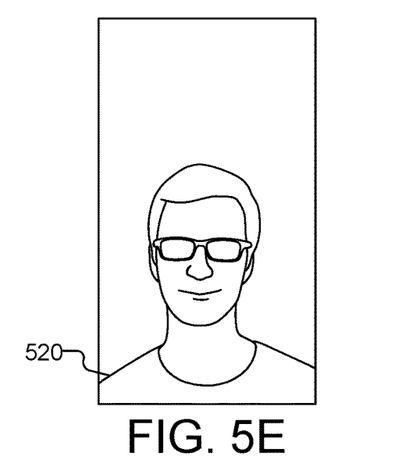
Figure 5F:
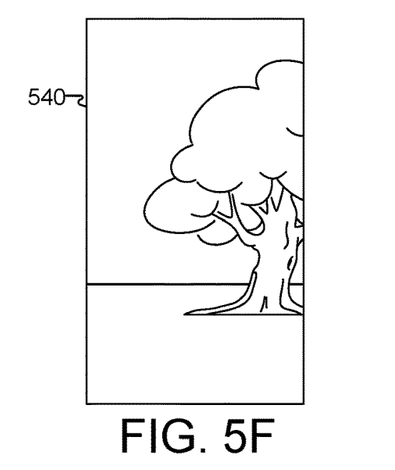
Figure 5G:
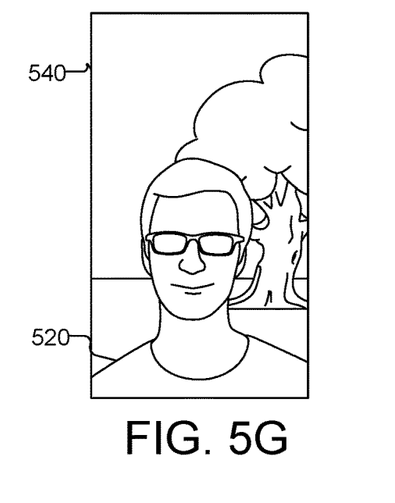

FIGS. 5A-5C and 5E-5G are diagrams illustrating another example of synthesis of composite images having a virtual background based on orientation, position, and/or location of mobile devices. In this embodiment, FIGS. 5A and 5E include two foregrounds 510 and 520 segmented from their original images with respective foreground masks. FIGS. 5B and 5F are two images with virtual backgrounds 530 and 540. As can be appreciated, the virtual backgrounds 530 and 540 can be generated based on the orientation, position, and/or location of the mobile device. FIGS. 5C and 5G are the resulting two composite images after synthesizing the respective foregrounds and backgrounds. As illustrated, as the mobile device moves, the virtual backgrounds 530 and 540 are adjusted in accordance with such movement.

In one embodiment, for a given mobile device orientation or motion, e.g., rotation, the composite image, as illustrated in FIGS. 5C and 5G, may be computed based on the following equation.

$$O = \alpha(I_{FG}(R_{mobile}))*I_{FG}(R_{mobile}) + (1-\alpha(I_{FG}(R_{mobile}))) *O_{BG}(I_{BG}, S_{BG}(I_{BG}), R_{matrix}(R_{mobile}))$$ Eq. 1

In this equation, O is a 2D image representing the final output to the mobile device screen. $I_{FG}$ is an image representing the input image from the mobile device, such as an image captured by a smartphone, which depend on the orientation or motion of the mobile device, represented by $R_{mobile}$. α is a segmentation function to generate a transparency mask for the foreground object, which takes one input, $I_{FG}$. By way of example and without any limitation, α is a portrait segmentation function.

$O_{BG}$ is another image generated, e.g., by using a rasterize function, which takes three inputs, $I_{BG}$, $S_{BG}$, and $R_{matrix}$. $I_{BG}$ is an equirectangular projected panoramic background image or video, which may also function as a texture map. $S_{BG}$ is a 3D spherical model generated using an equirectangular projection function, which takes $I_{BG}$ as an input. $R_{matrix}$ is a function to generate a 3D rotation matrix based on the orientation or motion of the mobile device ($R_{mobile}$). By way of example and without any limitation, OpenGL may be used for rasterization, and OpenGL GLU may be used for equirectangular projection.

Figure 6:
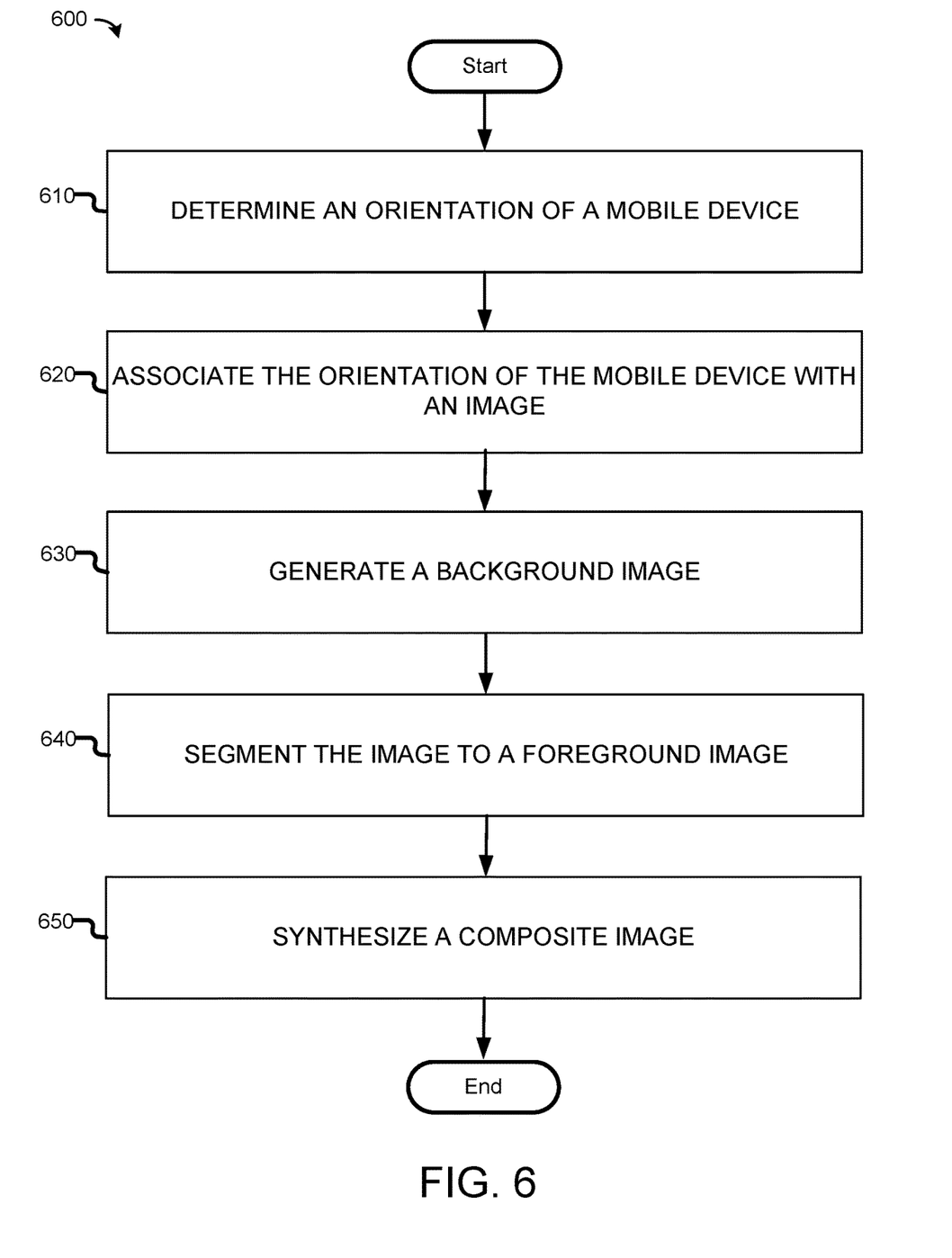
FIG. 6 is a flow diagram of an example process for synthesis of composite images, incorporating aspects of the present disclosure, in accordance with one embodiment.

FIG. 6 is a flow diagram of an example process for synthesis of composite images having virtual backgrounds based on movement of the mobile devices incorporating aspects of the present disclosure. Process 600 can be performed, for example, by system 200 of FIG. 2, to implement logics of composite image. Process 600 can be performed by processing logic that comprise hardware (e.g., circuitry dedicated logic, programmable logic, microcode, etc.), software (e.g., instructions run on a processing device to perform hardware simulation), or a combination thereof. It will also be appreciated that, in various embodiments, process 600 can have fewer or additional operations than those depicted, or perform some of the depicted operations in a different order without departing from the scope of this disclosure.

In various embodiments, the process begins at block 610, where an orientation of a mobile device is determined, e.g., by motion processor 210 of FIG. 2. In some embodiments, the mobile device has a camera, and the orientation of the mobile device is determined based on a facing direction of the camera. The orientation of the mobile device may be represented in a predetermined two-dimensional space. In one embodiment, the orientation of the mobile device is represented by an angle perpendicular to a gravitational axle. In other words, the angle of rotation of the mobile device on the plane perpendicular to the gravitational axle is used to represent the change of the orientation of the mobile device.

The orientation of the mobile device may be represented in a three-dimensional space, as shown in FIG. 3B, in one embodiment. After receiving various sensor data related to the orientation of the mobile device, a contemporaneous orientation of the mobile device may be determined based on the sensor data and a predetermined world coordinate system in the three-dimensional space, such as shown in FIG. 3A.

In one embodiment, the orientation of the mobile device is represented by a vector in a three-dimensional space. To compute this vector, the angular differences between the respective axes of a world coordinate system and a mobile coordinate system of the mobile device, as shown in FIG. 3B, may be calculated. Such angular differences are used to determine the direction of the vector. The direction of the vector is then used to associate a foreground image with a background image. In one embodiment, the magnitude of the vector may also be determined, e.g., based on the motion or movement of the mobile device, as further discussed in connection with FIG. 7.

At block 620, the orientation of the mobile device is associated with an image, e.g., by foreground processor 220 of FIG. 2. In some embodiments, this association is determined based on time. By way of example, when the mobile device is capturing an image at a particular orientation, the captured image becomes associated with the orientation. The particular orientation may become a part of the metadata stored with the image. Whereas in some embodiments, the orientation data can be stored separately from the image, and linked to the image based on the time data, e.g., the time of the image generation.

At block 630, a background image is generated, e.g., by background processor 230 of FIG. 2. An image resource can be selected in any number of ways to generate the background image. As one example, a user may select an image resource as utilizing for a desired virtual background. The user may browser various image resources, and select a particular image resource to put the foreground object into a virtual environment associated with the particular image resource. The background image may be generated from the selected image resource based at least in part on the determined orientation of the mobile device.

In various embodiments, the image resource is a three-dimensional (3D) world model for background, e.g., obtained from 3D modeling or 3D reconstruction. In one embodiment, the 3D world model for background is constructed from multiple 2D images via a 3D reconstruction process, which is a reverse process of obtaining 2D images from 3D scenes. In one embodiment, the image resource is a panoramic image, such as the one shown in FIG. 4A. In some embodiments, the panoramic image is in the equirectangular format, which is a single image of 360 degrees horizontally and 180 degrees vertically. Subsequently, a three-dimensional spherical model may be built from the panoramic image, such as shown in FIG. 4B, by, e.g., using an equirectangular projection function.

Further, a three-dimensional rotation matrix may be built based at least in part on the orientation of the mobile device. Using the panoramic image, the three-dimensional spherical model, and the three-dimensional rotation matrix as input, a rasterization function may be implemented to rasterize a part of the panoramic image to generate the background image.

At block 640, a foreground image is segmented from the original image, e.g., by foreground processor 220 of FIG. 2. Various techniques for foreground segmentation may be used, such as portrait segmentation or deep-learning based segmentation. In some embodiments, a transparency mask (e.g., a binary mask) for the foreground object is produced. The transparency mask can be used in the synthesis process.

At block 650, the foreground image and the background image are synthesized into a composite image, e.g., by synthesis factory 250 of FIG. 2. In some embodiments, techniques of image masking are used for synthesizing the foreground image and the background image. At a high level, image masking hides some portions of an upper image layer to reveal some portions of a lower image layer. With the binary mask produced from the foreground segmentation process, each pixel of the composite image can have two possible values. For example, 1 may correspond to the foreground while 0 may correspond to the background. Accordingly, all pixels of zeros may be made transparent to show the underlying virtual background image.

Figure 7:
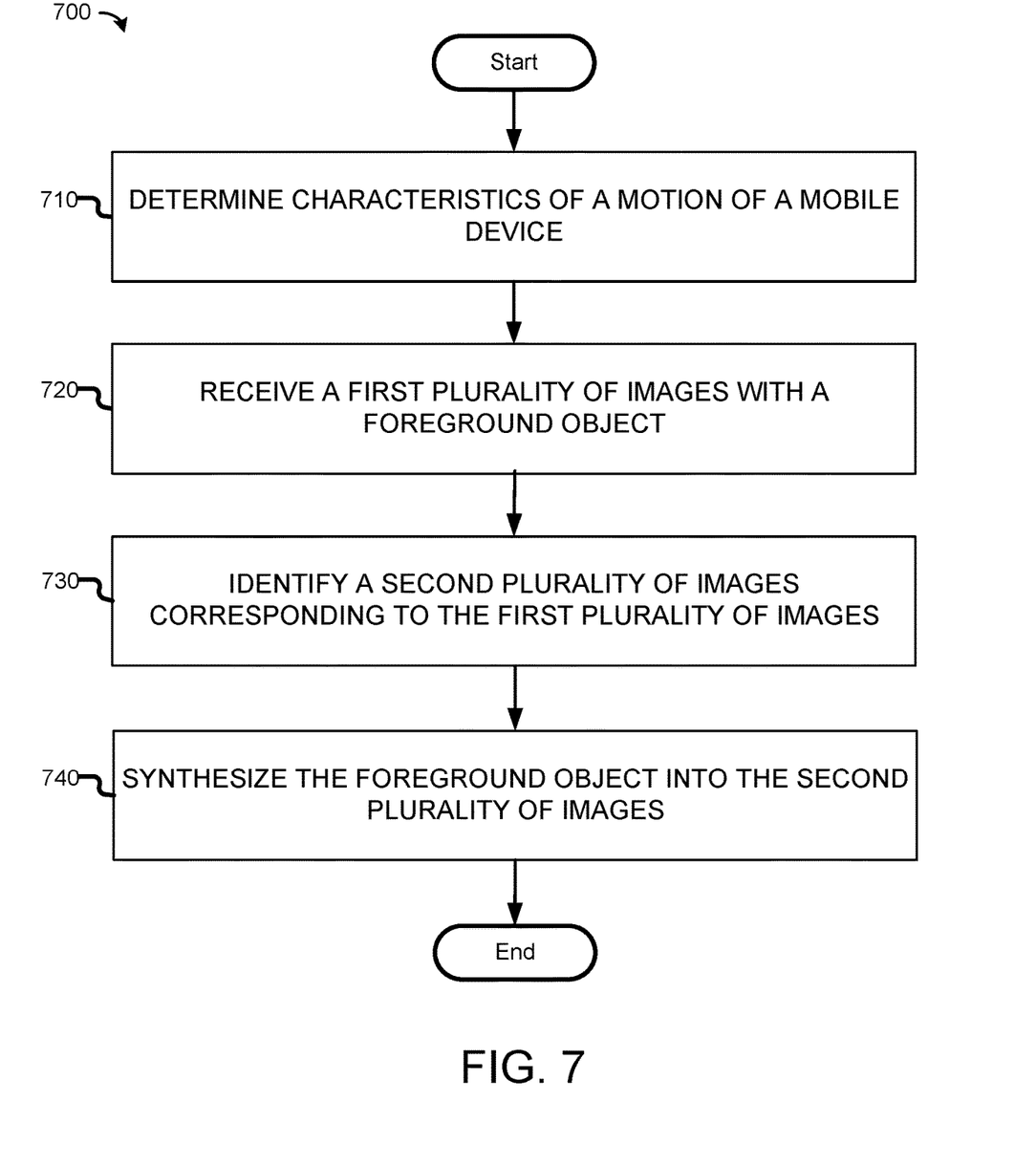
FIG. 7 is a flow diagram of another example process for synthesis of composite images, incorporating aspects of the present disclosure, in accordance with one embodiment.

FIG. 7 is a flow diagram of another example process for synthesis of composite images having virtual backgrounds associated with movement of mobile devices, incorporating aspects of the present disclosure. Process 700 can be performed, for example, by a system for synthesis of composite images, e.g., system 200 of FIG. 2. Similar to process 600, process 700 can be performed by processing logic that comprise hardware (e.g., circuitry, dedicated logic, programmable logic, microcode, etc.), software (e.g., instructions run on a processing device to perform hardware simulation), or a combination thereof. It will also be appreciated that, in various embodiments, process 700 can have fewer or additional operations than those depicted, or perform some of the depicted operations in a different order without departing from the scope of this disclosure.

In various embodiments, the process begins at block 710, where the characteristics of a motion of a mobile device is determined. In general, the motion of the mobile device refers to a change in position of the mobile device over time. The characteristics of the motion include the displacement, distance, velocity, acceleration, time, speed, etc. of the mobile device in view of a reference frame during a period of time of observation. Such characteristics of the motion may be determined from sensors either internal or external to the mobile device. By way of example, angular rate sensors or gyroscopes may be used to determine and track the angular speed of motion. Linear measurement sensors may be used to determine and track the linear speed, displacement, etc. of the motion. Further, the orientation of the mobile device in a three-dimensional space is also being tracked for some embodiments.

At block 720, a first set of images is received. In some embodiments, these images are a set of still images with a common foreground object. In some embodiments, these images are a set of still images with various foreground objects. In some embodiments, these images are sequential frames in a video. In some embodiments, these images are compiled by a user. The first set of images are taken by the mobile device in some embodiments. In this case, the first set of images are directly related to various characteristics of the mobile device (e.g., the orientation) during the shooting. However, in other embodiments, the first set of images maybe taken by another device, and imported into the mobile device or stored in a remote site, e.g., in a cloud storage.

In various embodiments, the first set of images may be identified based at least in part on one or more characteristics of the motion of the mobile device determined at block 710, such as the linear or angular speed of the mobile device or the orientation of the mobile device. The characteristics of the motion of the mobile device associated with each image may be stored in the metadata of the image. The first set of image may be selected based on the specific metadata associated with the characteristics of the motion of the mobile device. By way of example, if the selecting criteria is a particular orientation, then images with that particular orientation as indicated in the metadata will be retrieved.

At block 730, a second set of images corresponding to the first set of images is identified. In various embodiments, the second set of images are identified based on one or more characteristics of the motion of the mobile device as determined at block 710. By way of example, if the selecting criteria is a particular orientation, then images with that particular orientation will be retrieved or generated from image resources.

In some embodiments, the second set of images is identified based at least in part on a gesture detected by the mobile device, such as a distinct gesture of chopping or waving. The gesture may be predetermined to denote a specific option of identifying the second set of images. In some embodiments, the second set of images is identified based at least in part on one or more characteristics of the motion of the mobile device, such as the linear or angular speed of the mobile device or the orientation of the mobile device. In one embodiment, a ratio between a number of images in one set of images associated with the same image in another set of images may be determined based at least in part on the angular speed or the linear speed of the motion of the mobile device.

In some embodiments, the first set of images is a set of frames in a first video, and the second set of images is a set of frames in a second video. The number of frames in the first video may be the same as the number of frames in the second video. The frames of the two videos can then be paired based on their natural sequence in the respective videos. In some embodiments, the respective number of frames in the two sets of images may be counted, and a relationship of one-to-one, many-to-one, or one-to-many may be established between the two sets of images, e.g., based on a specific detected gesture of the mobile device or unique characteristics of the motion of the mobile device. For instance, a V shape of motion may denote a many-to-one option; a Λ shape of motion may denote a one-to-many option; and a horizontal linear motion may denote a one-to-one option.

As an example, suppose the total number of frames in the second video is greater than the total number of frames in the first video. Under the one-to-one option, the beginning part of the second video may be matched on a one-to-one basis to the first video. Under the one-to-many option, each frame of the first video may be matched with many frames of the second video based on, for example, the speed of the motion of the mobile device. For instance, the first short video may be taken by an action camera while a subject is running on a beach. The second long video may be taken while another subject is hiking on a ridge. In this case, the one-to-many matching may be implemented based on the ratio of the two speeds associated with the two videos. As a result, the composite video after replacing the beach background with the ridge background may enable the resulting video with the subject hiking on the ridge instead of running on the ridge. In other embodiments, the specific matching relationship between the two sets of images may be determined by other types of characteristics of the motion of the mobile device.

At block 740, the foreground object may be synthesized into each of the second set of images. As discussed earlier, the foreground object in the first set of images may be the same or changes from one image to another. Regardless, techniques of image masking may be used for synthesizing the foreground object and the virtual background.

Figure 8:
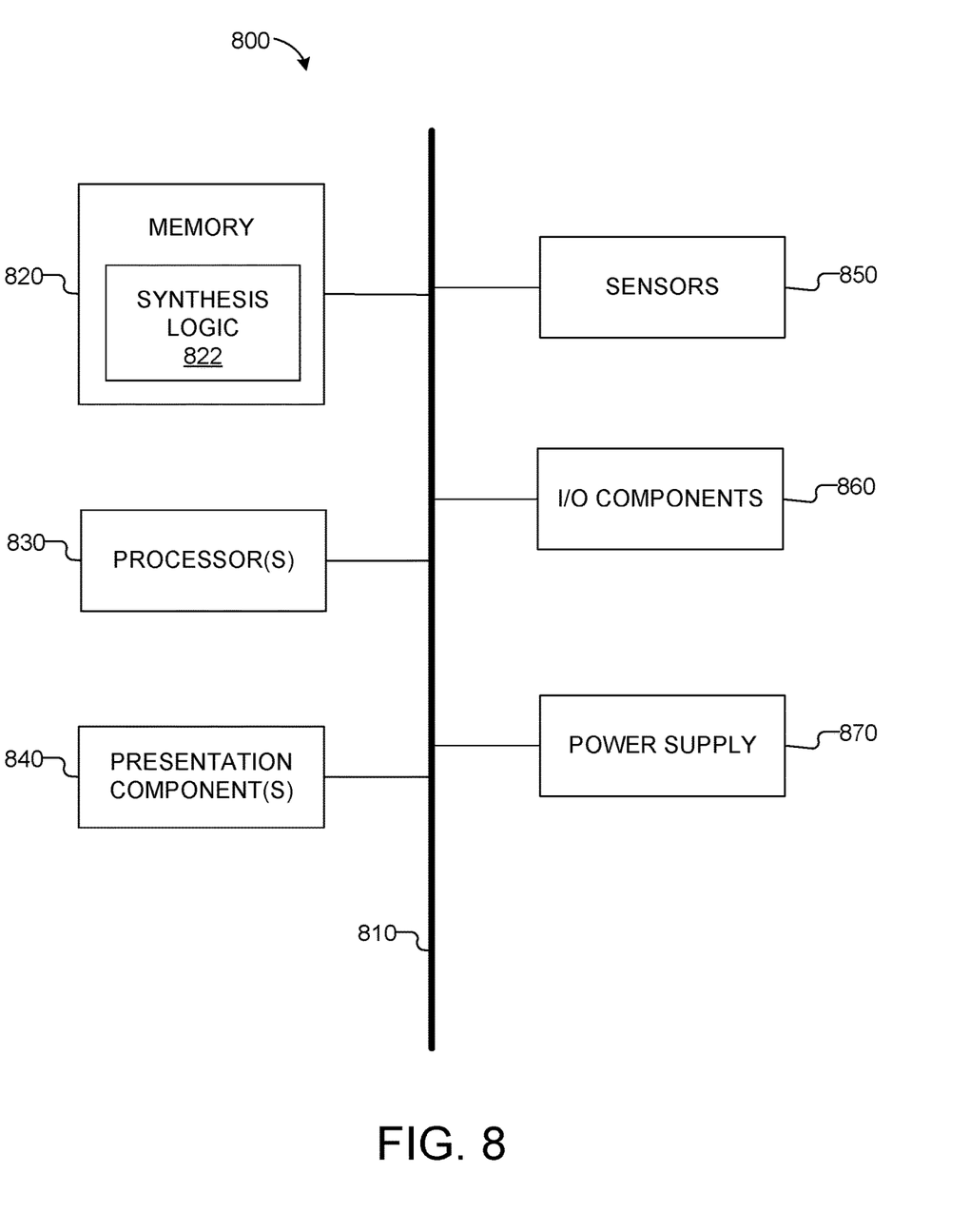
FIG. 8 illustrates an example computing device suitable for practicing the disclosed embodiments, in accordance with one embodiment.

Having briefly described an overview of embodiments of the present invention, an exemplary operating environment in which embodiments of the present invention are to be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The disclosure is described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 8, computing device 800 includes a bus 810 that directly or indirectly couples the following devices: memory 820, one or more processors 830, one or more presentation components 840, sensors 850, input/output (I/O) components 860, and an illustrative power supply 870. Bus 810 represents one or more busses (such as an address bus, data bus, or combination thereof). Although the various blocks of FIG. 8 are shown with lines for the sake of clarity, in reality, delineating various components is not so clear, and metaphorically, the lines would more accurately be fuzzy. For example, a presentation component such as a display device could also be considered as an I/O component. Also, processors have memory. The inventor recognizes that such is the nature of the art, and reiterates that the diagram of FIG. 8 is merely illustrative of an exemplary computing device that is used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media include any available media to be accessed by computing device 800, and include both volatile and nonvolatile media, and removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. In various embodiments, the memory is removable, non-removable, or a combination thereof. Exemplary hardware devices include solid-state memory, hard drives, optical-disc drives, etc. Computing device 800 includes one or more processors 830 that read data from various entities such as memory 820 or I/O components 860. Presentation component(s) 840 present data indications to a user or other device. Exemplary presentation components include a display device, speaker, printing component, vibrating component, etc.

In various embodiments, memory 820 includes, in particular, temporal and persistent copies of synthesis logic 822. Synthesis logic 822 includes instructions that, when executed by one or more processors 830, result in computing device 800 to produce a composite image by synthesizing a foreground with a virtual background, such as, but not limited to, examples illustrated in FIG. 1A-1C, 5A-5C, or 5E-5G, or perform a process, such as, but not limited to, process 600 or process 700. In various embodiments, synthesis logic 822 includes instructions that, when executed by processors 830, result in computing device 800 performing various functions associated with, but not limited to, motion processor 210, foreground processor 220, background processor 230, audio/video processor 240, or synthesis factory 250 in connection with FIG. 2.

In some embodiments, one or more processors 830 are to be packaged together with synthesis logic 822. In some embodiments, one or more processors 830 are to be packaged together with synthesis logic 822 to form a System in Package (SiP). In some embodiments, one or more processors 830 are integrated on the same die with synthesis logic 822. In some embodiments, processors 830 are integrated on the same die with synthesis logic 822 to form a System on Chip (SoC).

Sensors 850, logically coupled to other devices including I/O components 860, allow computing device 800 to interact with its environment. In accordance with embodiments described herein, sensors 850 can include various sensor component(s), e.g., gyroscope, accelerometer, and magnetometer, infrared lights, infrared cameras, motion sensors, light sensors, 3-D scanners, CMOS sensors, GPS sensors, etc. In various embodiments, sensors 850 can employ the aforementioned sensor components, among other things, to determine the position of computing device 800 in a 3-D space as well as the orientation of computing device 800 in the 3-D space, or to detect and track motions and movements of computing device 800.

In some embodiments, I/O components 860 include one or more cameras. A camera may include one or more sensor components from sensors 850. A camera includes a lens to focus light onto the sensor, so that the sensor can capture light, and an image processor can form a clear image from the light data. The sensor usually includes a complex integrated circuit that typically includes photodetectors that can capture light. In some embodiments, I/O components 860 include one or more depth cameras, such as stereoscopic camera systems, infrared camera systems, RGB camera systems, for forming 3-D images or detecting 3-D objects, e.g., for facial recognition or detecting gestures.

Although certain embodiments have been illustrated and described herein for purposes of description, a wide variety of alternate and/or equivalent embodiments or implementations calculated to achieve the same purposes could be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A computer-implemented method, comprising:
   determining an orientation of a mobile device in a three-dimensional space associated with an image taken by the mobile device;
   constructing a three-dimensional rotation matrix based at least in part on the orientation of the mobile device;
   generating a virtual background image based at least in part on the three-dimensional rotation matrix;
   segmenting the image to a foreground image; and
   synthesizing the foreground image and the virtual background image into a composite image.

2. The method of claim 1, wherein determining the orientation of the mobile device comprises receiving sensor data from one or more sensors of the mobile device, and measuring a contemporaneous orientation of the mobile device based at least in part on the sensor data and a predetermined world coordinate system in the three-dimensional space.

3. The method of claim 1, wherein determining the orientation of the mobile device comprises calculating a plurality of angular differences among respective axes of a world coordinate system and a mobile coordinate system of the mobile device, and representing the orientation of the mobile device with a vector associated with the plurality of angular differences.

4. The method of claim 1, wherein the mobile device has a camera, and wherein determining the orientation of the mobile device comprises determining the orientation of the mobile device based on a facing direction of the camera.

5. The method of claim 1, wherein generating the virtual background image comprises generating the virtual background image from a three-dimensional world model.

6. The method of claim 1, wherein generating the virtual background image comprises building a three-dimensional spherical model from a panoramic image, and rasterizing a part of an equirectangular projection of the panoramic image to the virtual background image based at least in part on the three-dimensional spherical model and the three-dimensional rotation matrix.

7. The method of claim 1, wherein segmenting the image comprises producing a transparency mask associated with the foreground image based on a portrait segmentation process.

8. The method of claim 7, wherein synthesizing the foreground image and the virtual background image comprises combining the foreground image and the virtual background image based at least in part on the transparency mask.

9. One or more computer storage devices comprising computer-implemented instructions that, when used by one or more computing devices, cause the one or more computing devices to:
   determine one or more characteristics of a motion of a mobile device;
   receive a first plurality of images with a foreground object;
   identify a second plurality of virtual background images corresponding to the first plurality of images based at least in part on the one or more characteristics of the motion of the mobile device, wherein the second plurality of virtual background images are selected from a third plurality of images based at least in part on a gesture formed by the motion of the mobile device; and
   synthesize the foreground object with each of the second plurality of virtual background images.

10. The one or more computer storage devices of claim 9, the instructions further cause the one or more computing devices to:
   determine a total number of the second plurality of virtual background images based at least in part on 1) a total number of the first plurality of images, and 2) a total number of the third plurality of images; and
   select the second plurality of virtual background images from the third plurality of images.

11. The one or more computer storage devices of claim 9, wherein the one or more characteristics include an orientation of the mobile device, the instructions further cause the one or more computing devices to:
   track the orientation of the mobile device in a three-dimensional space; and
   dynamically select the second plurality of virtual background images from the third plurality images based at least in part on the tracked orientation of the mobile device.

12. The one or more computer storage devices of claim 11, the instructions further cause the one or more computing devices to:
   determine a many-to-one relationship between a number of images in the second plurality of virtual background images to associate with a same image in the first plurality of images based at least in part on a gesture formed by the motion of the mobile device.

13. The one or more computer storage devices of claim 9, wherein the one or more characteristics include a speed of the motion of the mobile device, the instructions further cause the one or more computing devices to:
   track an angular speed or a linear speed of the motion of the mobile device; and
   select the second plurality of virtual background images from the third plurality images based at least in part on the angular speed or the linear speed of the motion.

14. The one or more computer storage devices of claim 13, wherein a total number of the second plurality of virtual background images is different from a total number of the first plurality of images.

15. The one or more computer storage devices of claim 14, the instructions further cause the one or more computing devices to:
   determine a ratio between a number of images in the second plurality of virtual background images to associate with a same image in the first plurality of images based at least in part the angular speed or the linear speed of the motion.

16. The one or more computer storage devices of claim 14, the instructions further cause the one or more computing devices to:
   determine more than one images in the first plurality of images to associate with a same image in the second plurality of virtual background images based at least in part on the angular speed or the linear speed of the motion.

17. A system, comprising:
   means for determining an orientation of a mobile device, the orientation of the mobile device corresponding to an image;
   means for accessing a virtual background image based at least in part on 1) a three-dimensional spherical model generated based at least in part on an equirectangular projected panoramic background image; and 2) a three-dimensional rotation matrix generated based at least in part on the orientation of the mobile device; and
   means for synthesizing a foreground image and the virtual background image into a composite image.

18. The system of claim 17, wherein the orientation of the mobile device is represented by a vector in a three dimensional space, and the virtual background image is associated with the vector in the three dimensional space.

19. The system of claim 17, wherein the image is a part of a video captured by the mobile device, and the image is captured when the mobile device is situated at the orientation.

20. The system of claim 19, wherein the virtual background image is derived from a three-dimensional world model for background.

* * * * *